United States Patent [19]
Reid

[11] Patent Number: 5,591,908
[45] Date of Patent: Jan. 7, 1997

[54] TORQUE MONITOR FOR TRAINING BICYCLISTS

[75] Inventor: Jerry C. Reid, New Market, Ala.

[73] Assignee: Amtec Corporation, Huntsville, Ala.

[21] Appl. No.: 184,924

[22] Filed: Jan. 24, 1994

[51] Int. Cl.$^6$ .................................................. G01L 5/00
[52] U.S. Cl. .................................. 73/379.07; 482/8
[58] Field of Search ........................... 73/379.01, 379.06, 73/379.07, 379.08, 862.191; 482/4, 5, 6, 8, 57; 364/506, 511

[56] References Cited

U.S. PATENT DOCUMENTS

| | | | |
|---|---|---|---|
| 3,845,663 | 11/1974 | Blomberg et al. | 73/379.07 |
| 4,141,248 | 2/1979 | Bargenda | 73/379.07 |
| 4,423,630 | 1/1984 | Morrison | 73/379.07 |
| 4,463,433 | 7/1984 | Hull et al. | 364/506 |
| 4,477,072 | 10/1984 | DeCloux | 482/4 |
| 4,625,551 | 12/1986 | Carnielli | 73/379.07 |
| 4,785,674 | 11/1988 | Orman et al. | 482/8 X |
| 4,915,374 | 4/1990 | Watkins | 482/57 |
| 5,018,392 | 5/1991 | Mercat | 73/862.191 |
| 5,027,303 | 6/1991 | Witte | 364/511 |
| 5,031,455 | 7/1991 | Cline | 73/379.07 |
| 5,050,865 | 9/1991 | Augspurger et al. | 482/8 X |
| 5,067,710 | 11/1991 | Watterson et al. | 73/379.07 X |
| 5,256,115 | 10/1993 | Scholder et al. | 482/6 |
| 5,257,540 | 11/1993 | Bower et al. | 73/379.07 |

*Primary Examiner*—Richard Chilcot
*Assistant Examiner*—Elizabeth L. Dougherty
*Attorney, Agent, or Firm*—John C. Garvin, Jr.; James E. Staudt

[57] ABSTRACT

The invention is a torque monitor which attaches to the crank arm of a bicycle pedaling mechanism. A drive link is pivotally attached at one end thereof to a mounting assembly which is rigidly attached to the bicycle crank arm. The end of the drive link opposite the attached end is adapted to receive a bicycle pedal, and is free to move a limited distance relative to the bicycle crank arm. As a positive torque is maintained during a pedaling cycle the free end of the drive link is forced toward the bicycle crank arm. If a negative torque is created, the free end of the drive link is force away from the bicycle crank arm and against a movement limiter. As the torque applied to the drive link changes, the movement of the free end provides both an audible and a tactile feedback to make a rider aware that an improper negative torque is being applied during the pedaling cycle. Drive links of varied lengths may be utilized to change the effective length of the bicycle crank arm.

14 Claims, 5 Drawing Sheets

Improper Technique
Transition Occurs

Proper Technique

TORQUE MONITOR FOR TRAINING BICYCLISTS

BACKGROUND OF THE INVENTION

1. Field of the invention

The present invention relates to a training device for bicyclists. The invention is adapted for attachment to the pedal crank arms of a bicycle and provides an audible warning as well as tactile feedback to the rider, in the event that the rider fails to maintain a positive torque to the crank arms during any phase of the rider's circular pedaling motion. The monitor may be inactivated, in which case it serves as a rigid pedal mount for normal operation of the bicycle.

2. Description of related art

While no known prior art performs a function similar to that of the present invention, the most pertinent related prior art is included in U.S. Pat. No. 4,606,241 to Fredricksson and U.S. Pat. No. 4,625,580 to Burt.

The Fredricksson patent relates to an adjustable crank assembly wherein the length of the arms of the crank assembly may be adjusted to suit the needs of the rider.

The Burt patent relates to a bicycle pedal mechanism which utilizes a cam mechanism for shifting the position of the pedals with respect to the crank arms so as to position the rider's feet to do useful work for a longer duration of a pedaling cycle than would otherwise be the case.

SUMMARY OF THE INVENTION

The present invention is a training device for bicyclists to improve the effectiveness of their pedaling technique. Most cyclists insist that they exert an upward force through toe straps during the upward phase of the pedaling cycle. However, studies have shown that, typically, a retarding neutral or negative torque rather than a positive torque is applied during the upstroke, and that this torque is more than twenty five percent of that being applied on the down stroke. To a surprising degree, the rider is pushing down with both feet at the same time.

Thus, it is apparent that to become an efficient bicyclist, one must engage in effective training to increase the efficiency of the pedal moving downwardly by "unloading" the pedal moving upwardly. This is accomplished by pulling up on the toe strap of the pedal moving upwardly in order to remove the counterproductive effect of the weight of the leg associated with that pedal. To accomplish this, cyclists are trained to develop a "circular" pedaling style wherein a productive or positive torque is applied to each pedal crank arm throughout a complete pedaling cycle. A pedaling cycle is considered to be one complete rotation of a pedal crank arm, which by definition includes the downward or forward stroke as well as the upward or backward stroke as applied by a bicyclist while propelling a bicycle in a forward direction.

In the past, limited training has been accomplished using bicycles with pedals which have been provided with force measuring instrumentation. A bicycle so outfitted is moored to a console by an instrumentation umbilical and is therefore stationary. This instrumentation measures the direction and magnitude of the force being applied to each pedal. The cyclist must then read the rapidly changing instruments while attempting to develop an effective pedaling technique. The shortcomings of this method of training include the high cost of this complex apparatus, the lack of availability of such equipment in all but elaborate bicycle training centers, and most importantly the facts that the bicycle to which this elaborate instrumentation is attached, is stationary and provides no input to the feet of the rider. From a stationary position the rider has no way of adapting the technique being learned to environmental influences, such as wind and changing terrain which are encountered during an actual ride.

The present invention overcomes these shortcomings by providing an inexpensive device which is available to all riders, which can easily be installed on any bicycle, which provides a rider with critical information relating to the most effective pedaling technique, and which may be used while riding in any environment. Additionally, the invention performs its functions without interference with the normal function of the bicycle.

More specifically, the invention is a torque monitor. In use, if a bicycle rider fails to maintain a positive torque at any time during the pedaling cycle, the torque monitor will produce an audible click and will shift the position of the pedal relative to the crank arm a sufficient amount to be sensed by the rider. The monitor may be easily inactivated. In an inactivated condition the monitor serves as a rigid mount for a bicycle pedal, and the bicycle is then operable in a conventional way. The monitor may also be easily modified to change the effective length of a bicycle crank arm.

Accordingly, it is an object of this invention to provide a torque monitor for monitoring the torque applied by a bicycle rider throughout each pedaling cycle and to indicate any change in the application of a productive or a nonproductive torque by producing audible signals and by tactile feedback through the feet of a bicycle rider.

It is an additional object of this invention to provide a torque monitor which is self contained and which may be utilized on bicycles which are mobile rather than stationary.

It is a further object of this invention to provide a bicycle torque monitor which is simple, and therefore inexpensive to manufacture.

It is another object of this invention to provide a bicycle torque monitor which is easily mounted to a bicycle.

It is yet another object of this invention to provide a bicycle torque monitor which may be utilized without interference with the normal operation of a bicycle.

It still another object of this invention to provide a bicycle torque monitor which may be simply inactivated for operation of a bicycle in a conventional manner.

Yet another object of this invention is to provide a bicycle torque monitor which may be modified to change the effective length of the bicycle crank arm to which it is attached.

These and other objects of the invention will be apparent to one skilled in the art from the following detailed description of specific embodiments thereof.

DESCRIPTION OF THE PREFERRED EMBODIMENTS

Figure 3:
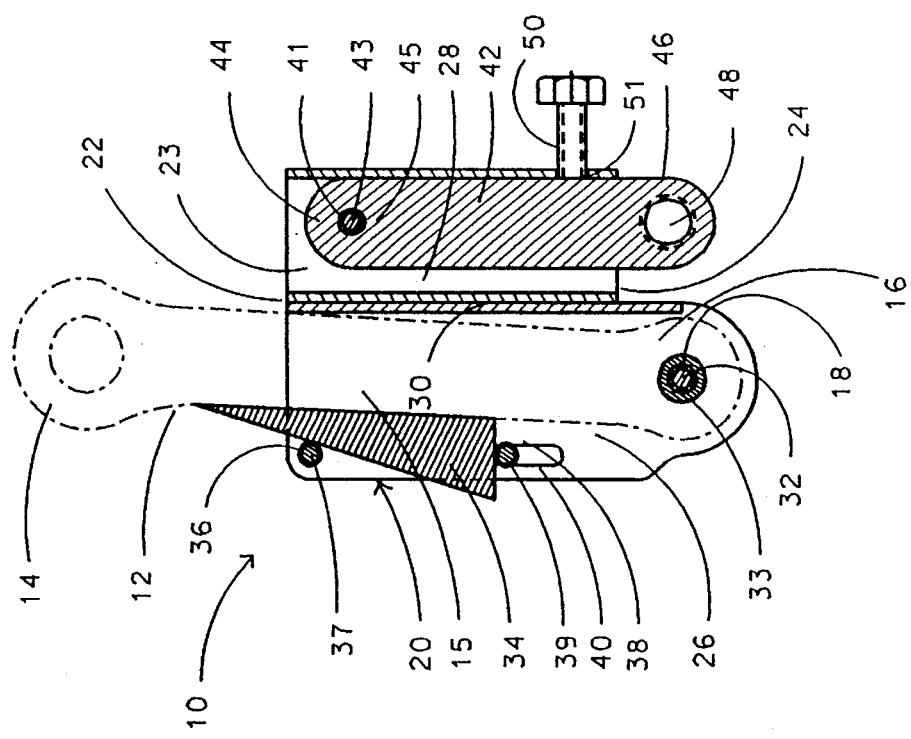
fig. 3 is a sectional view taken along line 3—3 of FIG. 2.
Figure 1:
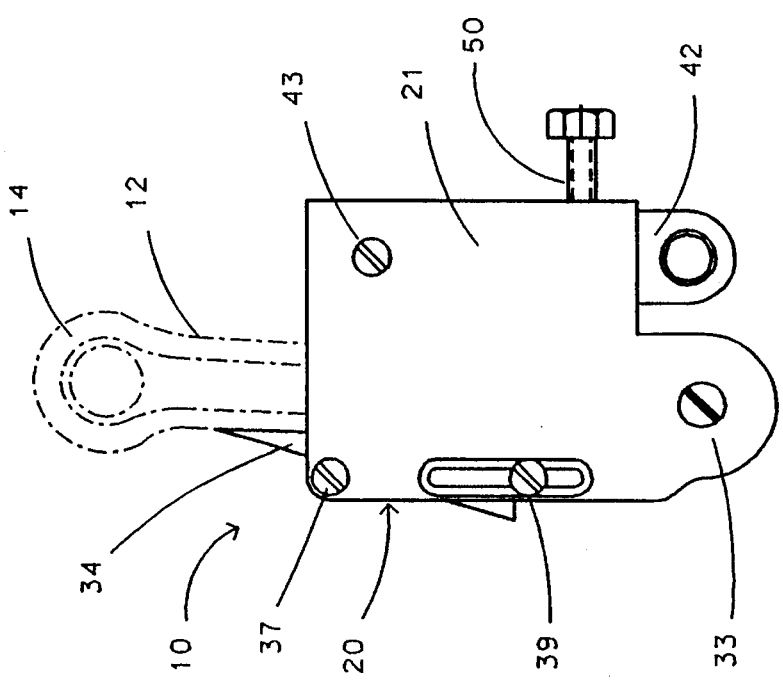
FIG. 1 is a front elevational view of a conventional bicycle crank arm illustrating one embodiment of the torque monitor attached thereto.
Figure 2:
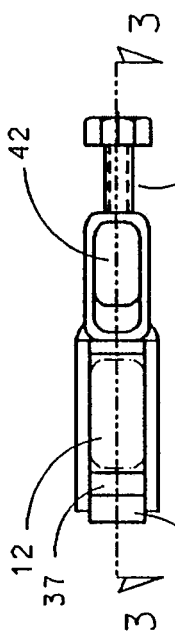
FIG. 2 is a top view of the torque monitor as illustrated in FIG. 1.
Figure 4:
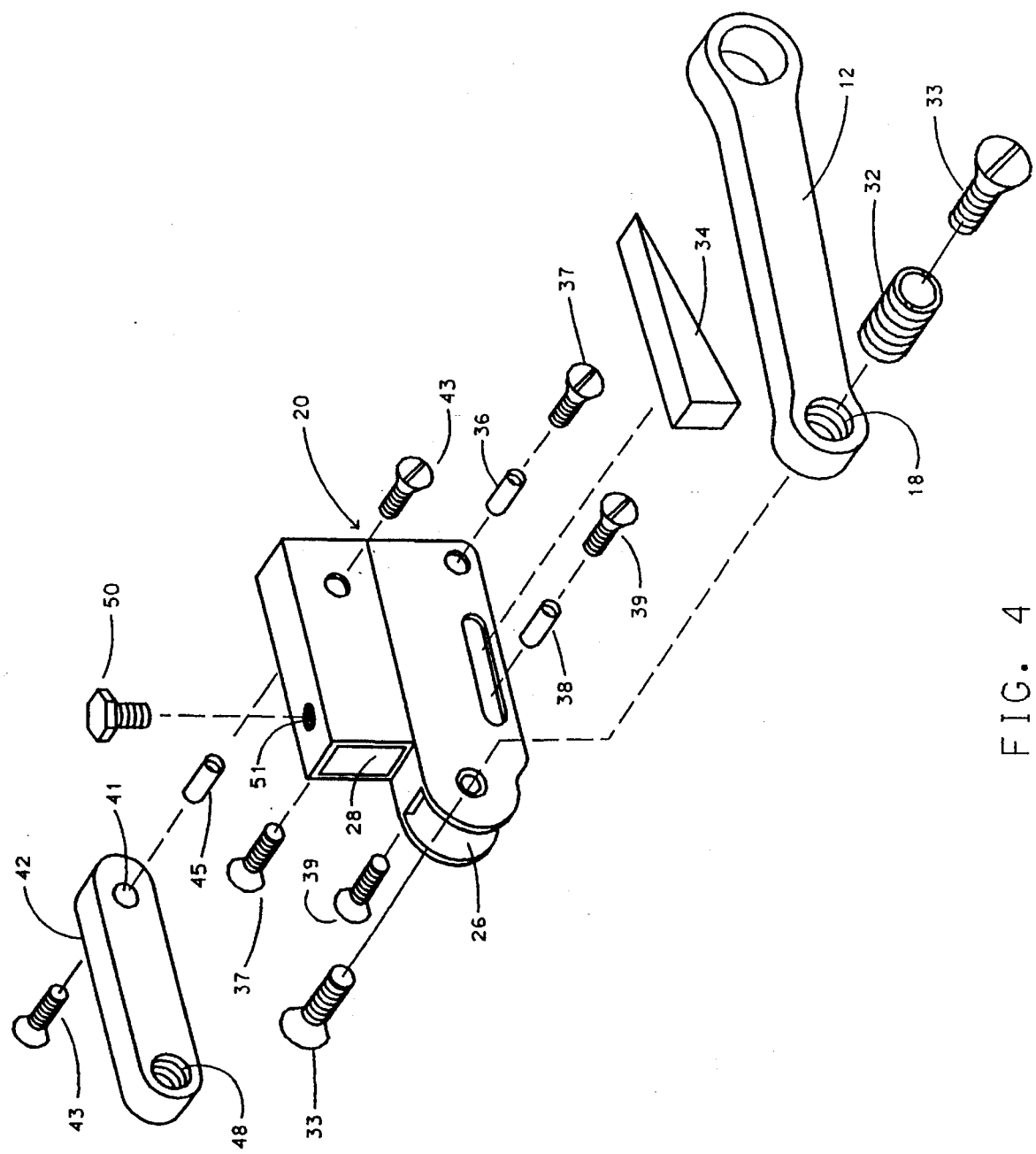
FIG. 4 is an exploded perspective view of the embodiment of the invention as illustrated in FIGS. 1–3.

Referring now to FIG. 1 of the drawings, it will be seen that a torque monitor which is the subject of this invention is illustrated generally by the numeral 10. The torque monitor 10 is adapted for attachment to a typical bicycle crank arm 12 which is shown in phantom. The bicycle crank arm 12 is adapted at one end 14 for connection to the pedal mechanism drive axle of a bicycle (not shown). Referring now to FIG. 3, a distal end 16 of the bicycle crank arm 12 includes a standard type threaded aperture 18 which is adapted for reception of a bicycle pedal. It is noted that, in application of the torque monitor 10, the aperture 18 of the bicycle crank arm 12 serves as a mounting point for attachment of the torque monitor, and a bicycle pedal is to be attached to the torque monitor in a manner to be described hereinafter. The bicycle crank arm 12 also includes an intermediate section 15 located between the ends 14 and 16 thereof. The elements of the torque monitor 10 are retained by a mounting assembly 20 which is adapted for attachment to the bicycle crank arm 12. The mounting assembly 20 has a front face plate 21 (best illustrated in FIG. 1), a back plate 23, an outer portion 24 adjacent the distal end 16 of the bicycle crank arm 12, and an inner portion 22, on the opposite end thereof. It is pointed out that throughout this application, descriptive terms such as inner and outer relate to the location of the element being described with respect to the rotational center (drive axle) of the pedal mechanism of a bicycle. The mounting assembly 20 also includes a pair of longitudinally extending compartments referred to as a first compartment 26 and a second compartment 28. The compartments are separated by a wall 30. The first compartment 26 is adapted for reception of a bicycle crank arm 12. The mounting assembly is adapted at the outer portion 24 thereof for attachment to crank arm 12. As best illustrated in FIG. 4, this attachment is accomplished by a retainer 32 which threadedly engages the aperture 18 and by a pair of screws 33 each of which passes through one of the faces 21 and 23 of the mounting assembly 20. The first compartment 26 is further defined by an adjustable tapered retainer block 34. When the torque monitor is mounted to the bicycle crank arm 12, the retainer block 34 is pressed firmly against the intermediate section 15 of the bicycle crank arm by a tubular pin 36 retained by a pair of screws 37 (best illustrated in FIG. 4) and by a similarly configured movable pin 38 which may be adjusted vertically in slots 40 formed in faces 21 and 23, by loosening a pair of screws 39. During installation or removal of the torque monitor, the movable pin 38 is moved downwardly to permit the downward and outward movement of block 34. It will be readily appreciated that in the downward and outward position, the block provides an enlargement in the first compartment 26 to facilitate installation or removal of the torque monitor 10 over the enlarged distal end 16 of the bicycle crank arm 12. A drive link 42 is positioned in the second compartment 28 of the mounting assembly 20. The drive link 42 is pivotally attached at a pivotal end 44 to the inner portion 22 of the second compartment 28, through an aperture 41, by a pair of screws 43 and a tubular bushing 45 (best illustrated in FIG. 4). A free end 46 of the drive link 42 extends below the outer portion of the second compartment 28 and terminates adjacent the distal end 16 of the bicycle crank arm 12. A hole 48 is formed in the free end 46, and is adapted for reception of a bicycle pedal (not shown). An adjustment screw 50 engages an opening 51 in compartment 28 adjacent the free end of the drive link 42. Thus movement of the free end of the drive link 42 is limited by the confines of the compartment 28, or if desired the screw 50 is utilized to reduce or eliminate the movement of the drive link 42 in accordance with the desires of a bicyclist. It will be noted that a change in the length of the drive link 42 changes the effective crank arm length of the bicycle. Thus, by simply changing drive links in the torque monitor a rider may experiment to determine the most desirable effective crank arm length. This feature is also useful in changing the effective crank arm length to match the terrain in which the rider anticipates riding. Because of their simplicity and smaller size, a rider may purchase a wide selection of drive links of various lengths for a fraction of the cost of a like number of bicycle crank arms.

Figure 6:
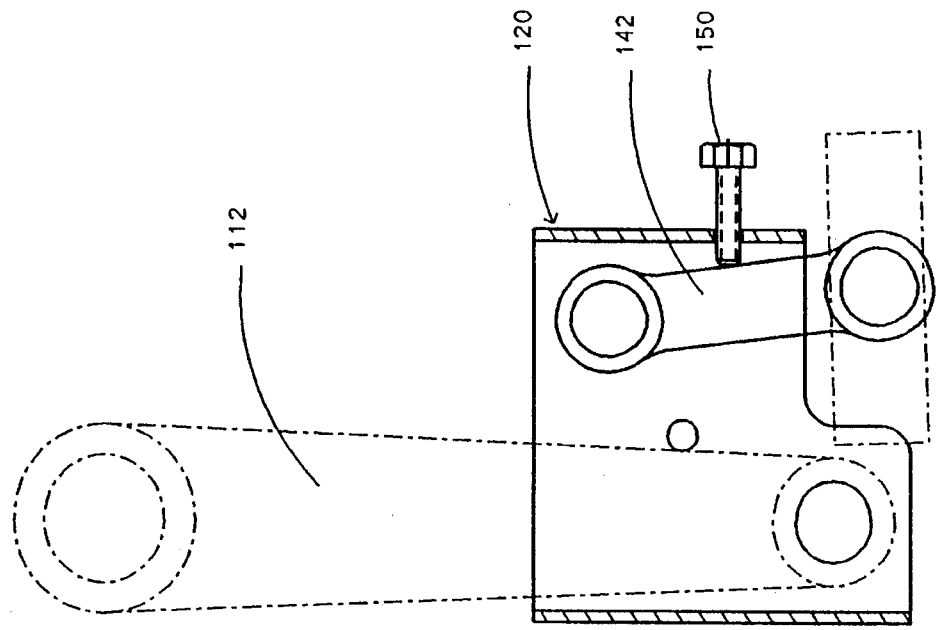
FIG. 6 is a front elevational view of the embodiment shown in FIG. 5, but showing the drive link in the undesirable position it would occupy when an improper pedaling technique is being used, and wherein a portion of the mounting assembly has been cut away to reveal the working parts therein.
Figure 5:
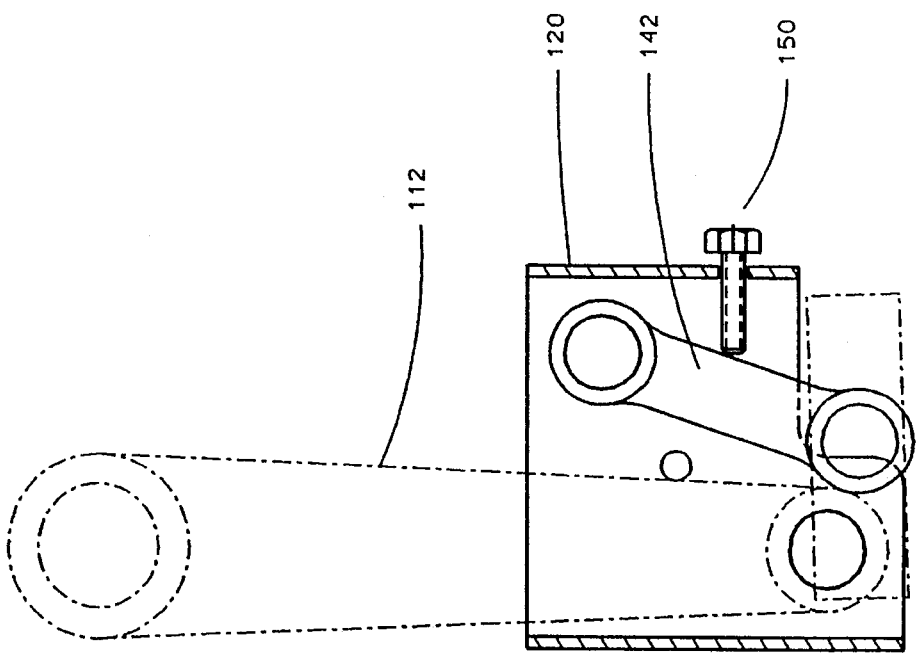
FIG. 5 is a front elevational view of an embodiment of the torque monitor wherein an alternate mounting assembly is illustrated, and showing the drive link in a deactivated position and wherein a portion of the mounting assembly has been cut away to reveal the working parts therein.

Referring now to FIGS. 5 and 6, an embodiment of the invention which utilizes a variation in the configuration of a mounting assembly 120 is illustrated. It will also be noted that the drive link 142 of FIG. 5 is shown in a deactivated position which has been accomplished by the rotation of adjustment bolt 150. FIG. 6 shows the position of the drive link 142 which would result from the application of a negative or improper torque.

Figure 7:
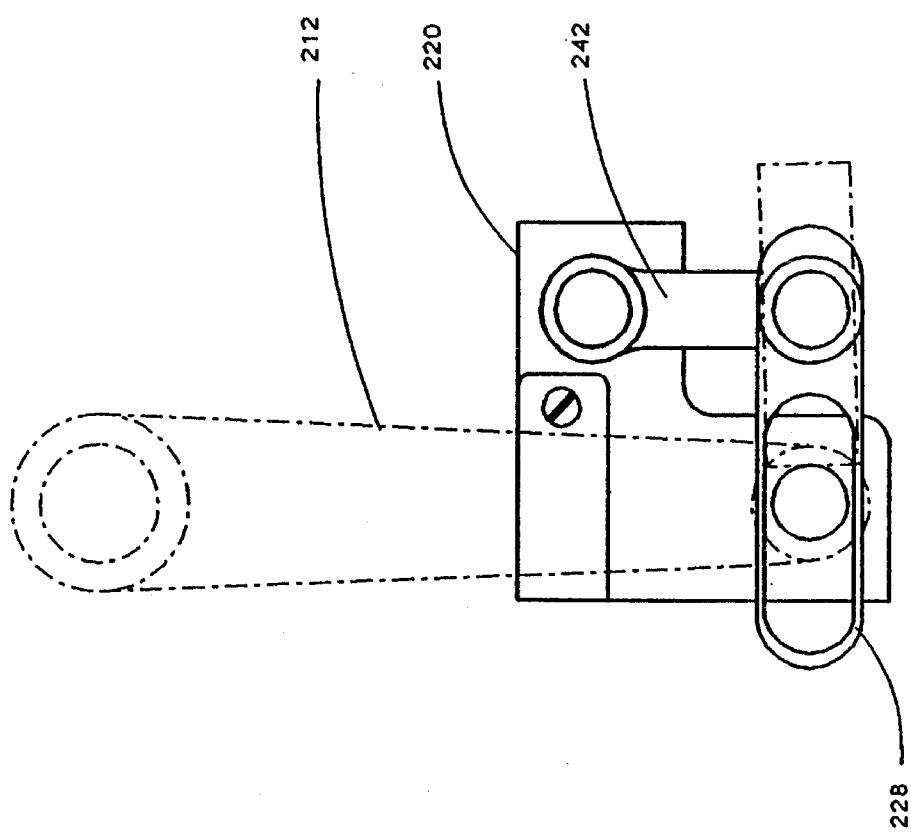
FIG. 7 is a front elevational view of an embodiment of the torque monitor wherein an alternate mounting assembly is illustrated, and wherein an alternate means is utilized to limit the movement of the drive link.

FIG. 7 illustrates an embodiment of the invention which utilizes variations in the configuration of a mounting assembly 220 and in the means for restricting the movement of the drive link 242. In this embodiment a slotted plate 228 is attached between the drive link 242 and the bicycle crank arm 212 via the axle of a bicycle pedal (not shown) for permitting a limited movement therebetween.

Figure 8:
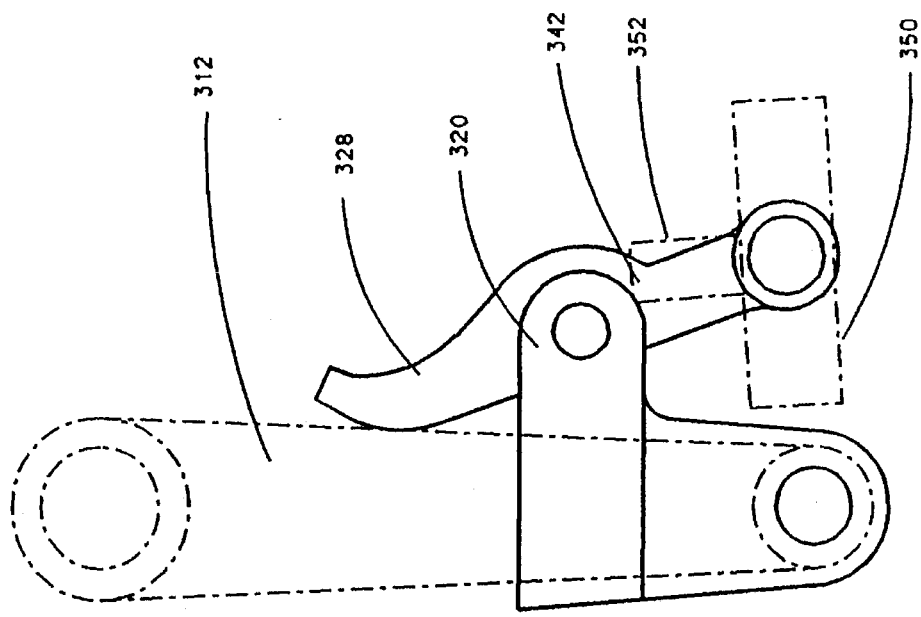
FIG. 8 is a front elevational view of an embodiment of the torque monitor wherein an alternate mounting assembly is illustrated, and wherein an alternate means is utilized to limit the movement of the drive link.

FIG. 8 illustrates an embodiment of the invention which utilizes variations in the configuration of a mounting assembly 320 and in the means for restricting the movement of a drive link 342. In this embodiment the drive link 342 is provided with an extension 328 for limiting the movement of the drive link 342 with respect to the bicycle crank arm 312. It will be noted that a bicycle pedal 350 with a pedal strap is illustrated in phantom. While such a strap or similar device is required in the use of this invention the illustration of a strap has been omitted from all figures but FIG. 8 so as to provide illustration of the elements of the torque monitor 10 with unobstructed clarity.

Figure 10:
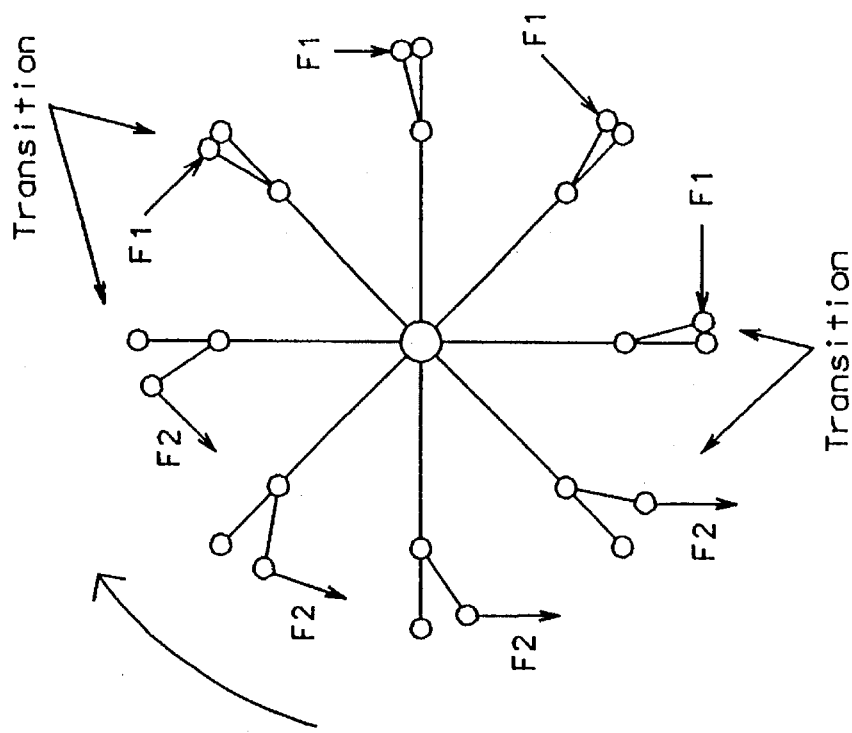
FIG. 10 schematically illustrates an improper bicycle pedaling technique which reduces maximum pedaling efficiency.
Figure 9:
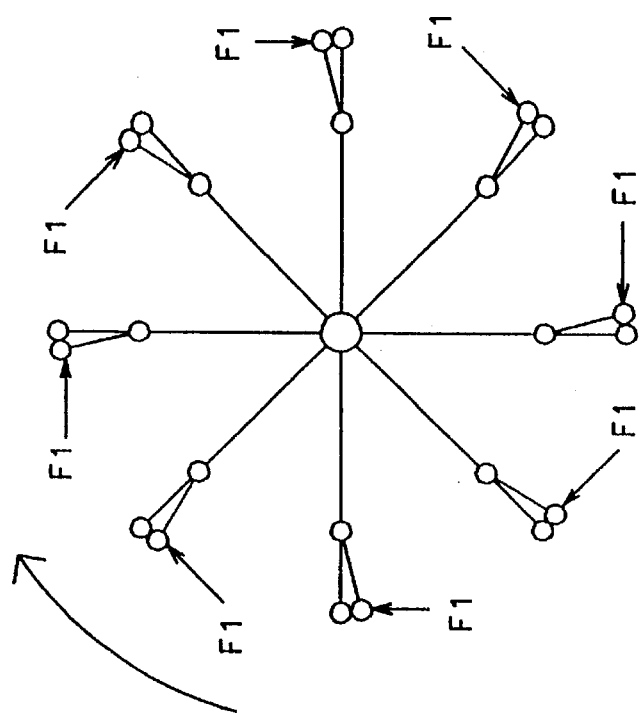
FIG. 9 schematically illustrates the proper bicycle pedaling technique for producing maximum pedaling efficiency.

FIGS. 9 and 10 are schematic representations of proper and improper bicycle pedaling techniques, and the effects of each technique upon the above described torque monitor. In these drawings the radial lines extending from the center of the schematic represent stages of rotation of a bicycle crank arm as it rotates in a clockwise direction. The shorter lines intersecting and theoretically pivotally connected adjacent the radially outer ends of the radial lines represent a drive link connected to the bicycle crank arm. As in the above described invention, the drive link is adapted to be driven by a bicycle pedal. In FIG. 9 wherein a proper pedaling technique is maintained by the bicycle rider, a continuous positive torque is being produced by the application of positive force F1 on the downward stroke and by the continued application of force F1 on the upward stroke. This positive force thus maintains the free end of the auxiliary crank in constant contact with the radially outer end of the bicycle crank arm throughout the pedaling cycle. In FIG. 10, wherein an improper pedaling technique is illustrated, a positive torque is being produced by the application of force F1 on the downward stroke, but a transition occurs and a negative torque is being produced by the application of a negative force F2 on the upward stroke. As illustrated by the force arrows and the transition notations, after the six o'clock position and until a position shortly after twelve o'clock, a negative force has been applied by the rider. As illustrated, this negative force moves the free end of the drive link away from the its previous contact with the radially outer end of the bicycle crank arm during this portion of the pedaling cycle.

In operation of the torque monitor, it is of course assumed that the free end of the drive link has been provided with a bicycle pedal having a toe strap to enable a rider to apply a positive pedaling torque during the upward portion of a pedaling cycle. As a positive torque is maintained during a pedaling cycle the free end of the drive link is forced toward the bicycle crank arm. If a negative torque is created by the bicycle rider the free end of the drive link is forced away from the bicycle crank arm. As the force applied to the drive link changes in either direction the free end of the auxiliary crank moves between its constraints in response to each change. As the free end of the drive link moves and contacts the metallic elements which limit its movements, both an audible and a tactile feedback signal is created to make the rider aware of the improper negative torque being applied during the pedaling cycle. Thus even a deaf bicycle rider would be aware of the movement of the free end of the drive link by virtue of the unique sensation of movement which is transmitted to the foot through the bicycle pedal. The torque monitor thus provides a unique training device to aid a bicyclist in improving pedaling techniques which provide maximum pedaling efficiency.

Obviously, numerous modifications and variations of the present invention are possible in light of the above teachings. For example, electrically operated lights, buzzers, or other type signal devices may also be actuated by the disclosed torque monitor. It is therefore to be understood that within the scope of the appended claims the invention may be practiced otherwise than as specifically described herein.

I claim:

1. A torque monitor for monitoring the torque applied to a pedal crank arm of a bicycle comprising a drive means pivotally attached to said pedal crank arm, for actuation in response to a change between the application of a positive or negative torque to said drive means, and for producing at least one signal in response to each said change.

2. A torque monitor as set forth in claim 1 wherein said signal is audible.

3. A torque monitor as set forth in claim 1 wherein said signal is tactile.

4. A torque monitor as set forth in claim 2 wherein a tactile signal is also produced.

5. A torque monitor for attachment to a pedal crank arm of a bicycle, said torque monitor comprising:
   a drive link having a pivotal end and a free end;
   mounting means for pivotally attaching said pivotal end of said drive link to said pedal crank arm;
   limiting means for restricting movement of said free end of said drive link with respect to said pedal crank arm;
   and wherein said free end of said drive link includes an aperture for reception of a bicycle pedal, whereby a force applied to said pedal in a direction toward said pedal crank arm will drive the free end of said drive link toward said pedal crank arm and against said limiting means, and a force in a direction away from said pedal crank arm will drive the free end of said drive link away from said pedal crank arm and against said limiting means.

6. A torque monitor as set forth in claim 5 wherein said limiting means is positioned adjacent the free end of said drive link.

7. A torque monitor as set forth in claim 6 wherein said limiting means is a slotted plate attached to the free end of said drive link and movably connected to said bicycle crank arm.

8. A torque monitor as set forth in claim 7 wherein said limiting means is an integral part of said mounting means.

9. A torque monitor as set forth in claim 5 wherein said limiting means is positioned adjacent the pivotal end of said drive link.

10. A torque monitor as set forth in claim 9 wherein said limiting means is an extension of said drive link from said pivotal end in a direction opposite the free end of said drive link, and wherein said extension is disposed for intermittent abutment against said bicycle crank arm.

11. A torque monitor for attachment to a bicycle crank arm, said bicycle crank arm being configured for attachment at one end thereof to a crank axle of said bicycle and configured at the distal end thereof for reception of a bicycle pedal, said torque monitor comprising:
   mounting means having inner and outer portions and first and second compartments, said first compartment being configured for reception of said bicycle crank arm and said outer portion thereof being configured for attachment to the distal end of said bicycle crank arm;
   a drive link having a pivotal end and a free end, said pivotal end being positioned within said second compartment of said mounting means and being pivotally attached to the inner portion of said mounting means, said free end of said drive link extending beyond said second compartment of said mounting means and terminating adjacent the distal end of said bicycle crank arm and being configured for attachment of a bicycle pedal thereto, whereby said free end of said drive link is free to move within said second compartment of said mounting means in either direction toward or away from the distal end of said bicycle crank arm in response to the change from the application of a positive to a negative torque or from a negative to a positive torque being applied to the free end of said drive link.

12. A torque monitor as set forth in claim 11 wherein said mounting means and said drive link create an audible signal as the free end of said drive link contacts the mounting means during movement in response to said torque changes.

13. A torque monitor as set forth in claim 12 wherein means are provided to limit movement of the free end of said auxiliary crank.

14. A torque monitor as set forth in claim 13 wherein adjustable means are provided within said mounting means for rigidly retaining the said mounting means to said bicycle crank arm.

* * * * *